July 23, 1940.    H. NYQUIST    2,209,064

MEASUREMENT OF PHASE SHIFT

Filed Nov. 12, 1938

INVENTOR
H. NYQUIST
BY H. A. Burgess
ATTORNEY

Patented July 23, 1940

2,209,064

UNITED STATES PATENT OFFICE 2,209,064

MEASUREMENT OF PHASE SHIFT

Harry Nyquist, Millburn, N. J., assignor to Bell Telephone Laboratories, Incorporated, New York, N. Y., a corporation of New York Application November 12, 1938, Serial No. 239,974

17 Claims. (Cl. 179—175.3)

This invention relates to the measurement of phase shift of alternating current waves through a transducer, and more particularly to the measurement of phase shift for determining the location of faults in non-loaded cable pairs which faults may result from high resistance joints between successive cable lengths. Thus, if one of the four conductors in a quad contains a poorly made joint this condition will cause side to phantom unbalance resulting in side to phantom cross-talk. For this reason, these faults may be studied by making measurements such as are made in measuring near-end cross-talk between the side and the phantom. Steady state measurements amounting to measuring the delay of the near-end cross-talk path are the simplest when there is only one path. However, it may be expected that in many cases there will be several minor paths in addition to the main one. The result of these even though they are individually small may be sufficient to invalidate the fault location.

It is an object of this invention to provide a method whereby faults may be located more rapidly and easily than heretofore.

A further object is to provide a method of fault location particularly applicable to those cases where conventional methods fail due to the presence of minor irregularities.

Another object is to enable fault location when there is phase shift in the fault itself.

The location of a fault according to the method of this invention, comprises the determination of the distance of the fault from the place of measurement. This distance may be determined in terms of the transmission of a wave of known periodicity. Assume a wave of 3,000 cycles per second traveling along a given line at a rate of 120,000 miles per second. Since there are 3,000 complete cycles in 120,000 miles, one complete cycle or 360 degrees is 40 miles in length. That is, the current 40 miles out is in phase with the current at the start and since 40 miles represents 360 degrees each degree represents one-ninth of a mile. Thus, if the frequency and the rate of travel or propagation over a line are known, the phase shift measures the distance. Distance may also be reckoned in terms of time of travel or delay. If 40 miles represents one cycle of a 3,000-cycle wave, the delay of that 40 miles or the time required for the 3,000-cycle wave to traverse it is $\frac{1}{3000}$ second.

A good method of measuring the phase shift in a transducer is disclosed in Nyquist et al. Patent 1,596,942, April 24, 1926, wherein an unknown phase shift is evaluated by comparison with phase shift produced by a known and calibrated phase shifter. Thus a sinusoidal voltage alternating at the frequency at which the measurement is desired is supplied in parallel to two circuits, one through the transducer and the other around it. The output of these two circuits is connected into an appropriate phase indicator and the phase of one voltage is adjusted by means of a calibrated phase shifter to bring the relative phase of the two voltages into a desired relation. The transducer is then replaced by a direct connection and the said relation restored by a change in adjustment of the phase shifter whereupon that change in adjustment of the phase shifter measures the phase shift of the unknown transducer.

Such a phase shift measuring set may often be advantageously used for the determination of distance or the length of a transmission circuit in the case of direct transmission. However, when the received wave is of the order of cross-talk and represents only a small fraction of the transmitted current, the result is often not conclusive. It may then become necessary to make a number of such measurements at a number of different frequencies in order that a reliable distance determination may be had thus adding greatly to the complication of measurements since a given phase shifter is ordinarily useful at but a single frequency. The measurement by the employment of the weak cross-talk current is complicated by the fact that there may well be a number of minor irregularities acting to return small currents out of phase with each other and with the cross-talk from the main fault whose location is sought, thus producing a distorted wave and an erroneous determination. Another difficulty to this determination of distance by phase shift according to previous methods arises from the fact that there may be phase shift in the fault itself. Also if the frequency employed is sufficiently high to produce a pronounced propagation effect, the distance involved may well amount to more than a single wave-length and the measuring set described affords no ready means of determining how many times the phase may have shifted through 360 degrees.

Aware of these difficulties, I have invented a new delay measuring set or fault locating set by which they may be avoided. For this purpose I employ an arrangement similar to that disclosed in copending application of G. B. Engelhardt, subject: "Measurement of phase shift," in which impulse generators of the type disclosed in Wrathall Patent 2,117,752, May 17, 1938, are inserted in the parallel paths of Nyquist et al., supra, so that there is transmitted over the parallel circuit a peaked wave which is made up of a plurality of the harmonics of the single frequency alternating current supply. By the use of this wave which is a composite of a large number of frequencies, the plurality of small effects produced by circuit irregularities tend to neutralize each other and a single reading representing delay, and hence distance, in terms of the travel of the peaked wave may be obtained. It is, of course, necessary to know or determine the rate of propagation of the peaked wave over a circuit of the sort under test.

For a more complete understanding of the invention reference is made to the drawing in which.

Figure 1:
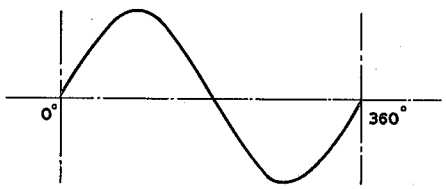
Fig. 1 represents a sinusoidal wave form.
Figure 2:
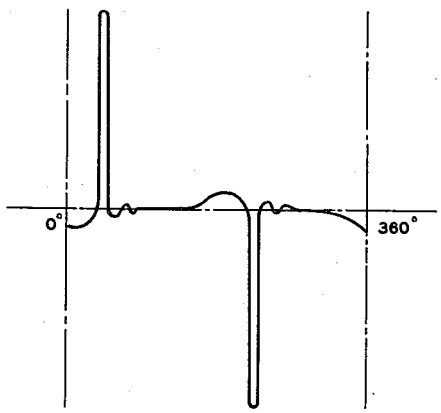
Fig. 2 represents the type of peaked wave form which may be derived from the sinusoidal wave form of Fig. 1 for use in the invention.
Figure 3:
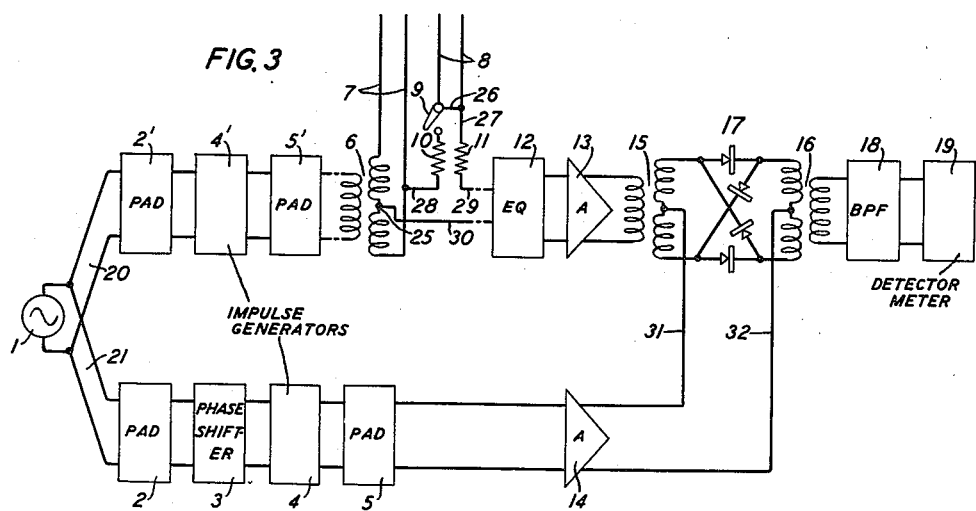
Fig. 3 shows in simple diagram a preferred embodiment of the invention for fault location measurements.

Referring to Fig. 3 the alternating current generator 1 supplies sinusoidal current at a frequency of, for example, 3,000 or 4,000 cycles to the parallel circuits 20, 21. Circuit 21 comprises in sequence a pad 2 designed to isolate circuit 21 from circuit 20 and to enable the adjustment of voltage level as desired, a phase shifter 3 calibrated to read angular phase shift at the frequency of generator 1, an impulse generator 4 adapted to convert a sinusoidal wave as Fig. 1 to an impulse wave as Fig. 2 in which a large number of harmonics of the frequency of Fig. 1 are present an isolating pad 5 and an amplifier 14. Circuit 20 comprises in sequence an isolating and adjusting pad 2', an impulse generator 4' equivalent to impulse generator 4, an isolating pad 5' and a transformer 6 through which current is supplied to one side 7 of the cable quad 7, 8. A phantom connection from quad 7, 8 is made between the mid-point 25 of the secondary of the transformer 6 and the strap 26 connecting the two conductors of side circuit 8 and connected by leads 29, 30 to equalizer 12 which precedes amplifier 13. Both circuits 20, 21 terminate in the triply conjugate detector 15, 17, 16 which is of the type disclosed in Cowan Patent 2,025,158, December 24, 1935. The detector 15, 17, 16 feeds through the transformer 16 into band-pass filter 18, which is adapted to pass only current of double the frequency of generator 1, and then into detector meter 19 which may take any convenient form as, for example, a rectifier and a direct current meter. The resistance 11 provides a convenient termination for the side circuit 8. Resistance 10 provides by way of switch 9 a means for by-passing the cable circuit and supplying directly to equalizer 12 current in phase with the current flowing into side circuit 7.

Suppose generator 1 supplies a sinusoidal alternating current at a frequency of 3,000 cycles per second, this current passes through pad 2' which is composed of resistances and thus produces no phase shift so that the voltage across impulse generator 4' is in phase with the output voltage of generator 1. Impulse generator 4' produces an impulse of the type shown in Fig. 2 which contains a great many harmonics of 3,000 cycles and this impulse wave is passed through transformer 6 into side circuit 7. If now at some position in circuit 7 a high resistance joint or other fault occurs, the static balance between side circuit 7 and side circuit 8 will be upset and there will be cross-talk to the phantom circuit and thus there will appear across conductors 29, 30 a voltage which is similar in wave form to that supplied by transformer 6 to side circuit 7 but which will have shifted in time relation an amount which represents the distance down to the fault and back again. Thus, if it has been determined that the rate of propagation of the impulse wave derived by impulse generator 4' from a sinusoidal wave of 3,000 cycles per second is, for example, 120,000 miles per second over cables such as that under test and indicated by the quad composed of side circuit 7, 8, then there will be an interval of 40 miles between corresponding points or successive positive peaks and thus, if the fault is actually 10 miles away, the distance traveled by the returned wave will be 20 miles corresponding to a phase shift of 180 degrees in terms of the 3,000-cycle wave from which the impulse wave was derived, or a delay of 1/6000 second.

The 3,000-cycle phase shift is determined as follows: The phantom cross-talk current received over conductors 29, 30 is passed through equalizer 12 amplified as desired by amplifier 13 and thus delivered to detector 15, 17, 16. The characteristic of the detector 15, 17, 16 is such that there is no output through transformer 16 from an input to transformer 15 in the absence of input from conductor 31, 32 to the bridge point of transformers 15, 16. However, generator 1 supplies to circuit 21 a voltage identical to that supplied to circuit 20. This voltage is applied to impulse generator 4 equivalent to impulse generator 4' and an impulse wave form of the same shape as that of generator 4' is produced. Pad 2 being a pure resistance produces no phase shift but phase shifter 3 may produce phase shift unless it is set at zero. The result of phase shift produced in circuit 21 by the phase shifter 3 in the 3,000-cycle output of generator 1 will be to cause the position in time of the impulses produced by impulse generator 4 to depart from the position in time of the impulses produced by impulse generator 4'.

If now the output of generator 4 is fed through pad 5 and amplifier 14 and via conductors 31, 32 to the bridge points of transformer 15, 16 the presence of this polarizing current will permit output transformer 16 and this output will be a composite of the currents reaching detector 15, 17, 16 from amplifier 13 and from amplifier 14.

The rectifier effect of detector 15, 17, 16 will result in transforming the wave form of Fig. 2 in which, for a 3,000-cycle fundamental, positive impulses are alternated with negative impulses with an interval between a positive impulse and a negative impulse of 1/6000 of a second into a wave form in which all pulses are of the same polarity and 1/6000 second apart. The maximum 6,000-cycle amplitude will occur when the input from amplifier 13 and the input from amplifier 14 are precisely in phase. In this case there will be a maximum transmission through band-pass filter 18 which is designed to pass only 6,000 cycles and there will thus be a maximum reading of the detector meter 19.

Having adjusted the phase shifter 3 to produce such a maximum reading of detector meter 19 for the condition in which the conjugate inputs to the detector 15, 17, 16 are, first, the current in which delay has been introduced due to its passage through the length of cable 7, 8 and, second, the current in which delay has been introduced due to the action of the phase shifter 3, the switch 9 is closed thus substituting for said first current through the cable a current directly from transformer 6 through conductor 28, resistance 10, switch 9, strap 26, conductor 27, resistance 11 and conductor 29. Negligible delay is produced by this substitute connection and thus when amplifier 13 has been readjusted in view of the larger current received directly from transformer 6 and the phase shifter 3 has been changed to again cause maximum reading of detector meter 19, this change in the phase shifter measures a delay which is equivalent to that produced by the cable circuit. From this delay which is measured in terms of 3,000-cycle phase shift the distance to the fault may be determined. The 3,000-cycle phase shifter merely provides a means for changing the time relation of the impulse wave a known amount.

Thus it is apparent that in the case of, for example, a long uniform line, distance may be readily determined by a measurement of the shift in phase in a single sinusoidal wave. This is based upon the presumption that each differential length of line causes or is accompanied by a similarly small shift in phase. However, when the line is not uniform due to irregularities of one sort or another this method of distance determination may be expected to fail since the said irregularities may be presumed of themselves to cause additional phase shifts and these additional phase shifts will obviously have no relation to the length of line traversed.

As indicated above, one procedure in such a case is to make measurements at a series of frequencies whereupon it is possible to determine by comparison which phase shifts are due to distance, which due to irregularities. Such a procedure is laborious and is avoided by the method of the invention whereby a whole series of frequencies is transmitted simultaneously as an impulse wave. Line irregularities will produce phase shifts in the individual component frequencies, which phase shifts will in general vary directly with frequency, and, since a large number of frequencies are included in the impulse wave, will tend to compensate each other resulting at most only in distortion of the form of the impulse wave. There will be no change in the time relation of the impulse wave itself except that representative of the distance it has travelled.

Thus a method of making a fault location by the determination of delay and the distance corresponding therewith is disclosed in which the ordinarily attendant difficulties of multiple disturbing currents, angles above 360 degrees and angles in the fault itself are eliminated by the employment of a composite wave of the impulse type.

Some difficulty may in some instances be encountered in getting an accurate location due to distortion of the pulse in the line. In these cases the equalizer 12 may be used. A preliminary location is obtained without the equalizer and then the equalizer appropriate to the length of line found is inserted and the delay is again measured whereupon a very precise location can be made.

I have thus disclosed in particular example and embodiment a preferred means for the practice of my invention. It is understood, however, that this example and this embodiment are only illustrative and are not to be interpreted in any sense as limiting the scope or number of other embodiments which may be readily devised without departing from the spirit of the invention as defined by the claims.

What is claimed is:

1. In combination, a source of alternating current, a detector, two paths from said source to the input of said detector, an adjustable phase shifter, an impulse generator and a transducer in sequence in one path, an equivalent impulse generator and a transducer in the second path, and a switch whereby one of said transducers may be removed and a direct connection established.

2. In combination, a source of alternating current, a detector, two paths from said source to the input of said detector, an adjustable phase shifter, an impulse generator and a transducer of phase delay in one path, an equivalent impulse generator and a transducer of unknown phase delay in the other path and a switch whereby said unknown transducer may be removed from said other path and a direct connection established thereacross.

3. In combination, a source of alternating current, a detector, two parallel paths connecting said source and said detector, an adjustable phase shifter, an impulse generator and a transducer of known phase delay in sequence in a first one of said paths, an equivalent impulse generator and a transducer of unknown phase delay in sequence in the second path, a switch whereby said unknown transducer may be removed from said second path and a direct connection established thereacross and means providing conjugate connections from the input of said detector to said paths.

4. In combination, a source of alternating current of predetermined frequency, a selective detector, two separate paths joining said source and said detector, means providing conjugate connections from said paths into said detector, an adjustable phase shifter calibrated in terms of the frequency of said source, an impulse generator and a transducer of known phase delay in sequence in the first one of said paths, an equivalent impulse generator and a transducer of unknown phase delay in sequence in the second one of said paths, a switch whereby said unknown transducer may be short-circuited in said second path, and said detector tuned to double the frequency of said source of alternating current.

5. The method of determining phase shift of an alternating current wave which consists in producing a fundamental wave, deriving therefrom two discrete series of impulses, introducing an unknown phase shift in one series of impulses, shifting the phase of the portion of the fundamental waves from which the other series of impulses is derived until the two series of impulses are in phase, and removing the phase shift introduced in the one series of impulses and shifting the phase of the portion of the fundamental waves from which the other series of impulses is derived until the two series of impulses are again in phase, the difference in the phase shift of the portion of the fundamental waves from which the other series of impulses is derived representing the unknown phase shift introduced in the one series of impulses.

6. The method of locating in a cable quad. a fault causing phantom to side cross-talk which consists in transmitting over one side of said quad a series of impulses, picking up the resultant cross-talk on the phantom of said quad and determining the distance to the fault causing said cross-talk from the impulse delay time of said series of impulses through the side-to-phantom circuit.

7. The method of measuring phase delay of an alternating current wave in electrical apparatus which consists in producing a fundamental frequency wave, deriving therefrom two discrete series of impulses, alternately applying one series of impulses to the apparatus whose phase delay is to be measured and removing it therefrom, applying the other series of impulses to an electrical apparatus of known phase delay, and shifting the phase of the portion of the fundamental waves from which the other series of impulses is derived so that the two series of impulses are in phase both when the one series of impulses is applied to the apparatus whose phase delay is to be measured and when it is removed therefrom, the difference in phase shift of the portion of the fundamental waves from which the other series of impulses is derived representing the phase delay of the apparatus whose phase delay is to be measured.

8. In combination, a source of alternating current, a phase detector, a pair of conducting paths leading from said source of alternating current to said phase detector, the first one of said paths having therein an impulse producing device comprising an inductance coil having a saturable magnetic core and in sequence thereto a transducer of unknown delay, the second of said paths having therein an equivalent impulse producing device, in sequence thereto a transducer of known or negligible delay and calibrated phase shifting means preceding said impulse producing device in said second path.

9. A system for making delay measurements comprising a source of alternating current, a pair of transmission circuits connected in parallel across said source, a first one of said transmission circuits comprising in sequence a calibrated phase shifter and an impulse producing device operated by magnetic saturation, the second one of said transmission circuits comprising in sequence an impulse producing device operated by magnetic saturation and a switch adapted in its operated position to cut into said second circuit a transducer whose delay is to be measured and in its non-operated position to cut said second circuit directly through to its output terminal, and means terminating the outputs of said transmission circuits adapted to indicate the time relation of the impulses received respectively from said circuits.

10. A system for making delay measurements according to claim 9 in which said output terminating means is adapted to indicate phase conjunction of received impulses.

11. A system for making delay measurements according to claim 9 in which said output terminating means is adapted to prevent interaction between said transmission circuits.

12. A system for making delay measurements according to claim 9 in which said output terminating means is adapted to prevent interaction between said transmission circuits and comprises a signal suppressing bridge-type modulator, a filter tuned to double the frequency of the alternating current source and a detector meter.

13. A delay measuring set comprising a source of alternating current feeding into a two-branched transmission circuit, the first one of said branches equipped with a device adapted to translate each one-half wave of said alternating current into a single impulse of short duration, said impulse being produced at a predetermined and fixed position and time in the half wave and in sequence thereto the transducer whose delay is to be measured, the second one of said branches equipped first with a phase shifter and then in sequence with an impulse producing device substantially equivalent to that in said first branch and an output network adapted to associate together in conjugate relation the output of the respective branches and feed them into a detector meter adapted to indicate the time relation between the impulses received from the respective branches.

14. A delay measuring set according to claim 13 in which an amplifier directly preceding the output is included in at least one of said branches and adapted to equalize the output of the two branches and adjust them to the level of efficient operation of the detector meter.

15. A delay measuring set according to claim 13 in which an equalizer and an amplifier are inserted in said first branch in sequence to said transducer, said equalizer being adapted to equalize the frequency attenuation characteristic of said transducer and said amplifier being adapted to compensate for over-all attenuation of said transducer and said equalizer.

16. The method of determining phase shift in a cable quad which comprises producing a fundamental wave, deriving therefrom two discrete series of impulses, transmitting over one side of said quad one series of impulses, picking up the resultant cross-talk on the side-to-phantom circuit of said quad, shifting the phase of the portion of the fundamental waves from which the other series of impulses is derived until the cross-talk and the other series of impulses are in phase, and short-circuiting the side-to-phantom circuit of said quad and shifting the phase of the portion of the fundamental waves from which the other series of impulses is derived until the two series of impulses are again in phase, the difference in phase shift of the portion of the fundamental waves from which the other series of impulses is derived representing the phase shift of the side-to-phantom circuit.

17. In combination, a source of fundamental frequency waves, two identical impulse generators connected thereto, each generated impulse comprising harmonics of the fundamental waves, a phase shifter interposed between the source and one impulse generator, a selective detector, circuit means connecting the input of the detector to the output sides of both impulse generators, apparatus whose phase shift characteristic is to be measured, and switching means to connect the apparatus in series between the output of the other impulse generator and the input of the detector and to short-circuit the apparatus, the detector selecting a harmonic frequency, which is twice the frequency of the fundamental waves.

HARRY NYQUIST.